United States Patent
Hueffer et al.

(10) Patent No.: US 10,907,259 B2
(45) Date of Patent: Feb. 2, 2021

(54) PROCESS FOR CLEANING SOILED METAL SURFACES AND SUBSTANCES USEFUL FOR SUCH PROCESS

(71) Applicant: BASF SE, Ludwigshafen (DE)

(72) Inventors: Stephan Hueffer, Ludwigshafen (DE); Alejandra Garcia Marcos, Ludwigshafen (DE); Eva-Maria Reis-Walther, Breuberg (DE)

(73) Assignee: BASF SE, Ludwigshafen am Rhein (DE)

( * ) Notice: Subject to any disclaimer, the term of this patent is extended or adjusted under 35 U.S.C. 154(b) by 396 days.

(21) Appl. No.: 15/552,867

(22) PCT Filed: Feb. 16, 2016

(86) PCT No.: PCT/EP2016/053210
§ 371 (c)(1),
(2) Date: Aug. 23, 2017

(87) PCT Pub. No.: WO2016/135000
PCT Pub. Date: Sep. 1, 2016

(65) Prior Publication Data
US 2018/0119291 A1    May 3, 2018

(30) Foreign Application Priority Data
Feb. 25, 2015  (EP) .................................... 15156517

(51) Int. Cl.
| | | |
|---|---|---|
| *C23G 1/06* | (2006.01) | |
| *C08G 73/02* | (2006.01) | |
| *C11D 3/37* | (2006.01) | |
| *C11D 11/00* | (2006.01) | |
| *C11D 1/72* | (2006.01) | |
| *C11D 1/835* | (2006.01) | |
| *C23G 5/06* | (2006.01) | |
| *C08L 79/02* | (2006.01) | |
| *C10G 33/04* | (2006.01) | |

(52) U.S. Cl.
CPC ........... *C23G 1/061* (2013.01); *C08G 73/024* (2013.01); *C08G 73/0213* (2013.01); *C08L 79/02* (2013.01); *C10G 33/04* (2013.01); *C11D 1/72* (2013.01); *C11D 1/835* (2013.01); *C11D 3/3723* (2013.01); *C11D 11/0029* (2013.01); *C23G 5/06* (2013.01)

(58) Field of Classification Search
CPC .................................................... C23G 1/061
See application file for complete search history.

(56) References Cited

U.S. PATENT DOCUMENTS

| | | | |
|---|---|---|---|
| 3,798,086 A * | 3/1974 | Muenker | C06B 45/105 149/19.1 |
| 4,935,162 A | 6/1990 | Barthold et al. | |
| 5,401,439 A | 3/1995 | Elfers et al. | |
| 5,445,765 A | 8/1995 | Elfers et al. | |
| 9,328,201 B2 * | 5/2016 | Ebert | C08G 65/2624 |
| 2007/0270323 A1 | 11/2007 | Stedry et al. | |
| 2009/0124528 A1 | 5/2009 | Danziger et al. | |
| 2009/0215662 A1 * | 8/2009 | Boeckh | C08G 73/0206 510/221 |
| 2012/0122747 A1 * | 5/2012 | Nekmard | C11D 1/28 510/218 |
| 2012/0216949 A1 | 8/2012 | Carey Stachowski et al. | |
| 2013/0284211 A1 * | 10/2013 | Garcia Marcos | C11D 3/3723 134/25.2 |
| 2014/0163199 A1 * | 6/2014 | Hueffer et al. | C08G 73/0213 528/424 |
| 2015/0361381 A1 | 12/2015 | Ebert et al. | |
| 2016/0002572 A1 | 1/2016 | Ebert et al. | |

FOREIGN PATENT DOCUMENTS

| | | |
|---|---|---|
| DE | 19819187 A1 | 11/1999 |
| EP | 0851023 A2 | 7/1998 |
| EP | 1817398 A1 | 8/2007 |
| WO | 2006058570 A1 | 6/2006 |
| WO | 2006086485 A1 | 8/2006 |
| WO | 2011092145 A1 | 8/2011 |
| WO | WO2013076024 * | 5/2013 |

OTHER PUBLICATIONS

Levy et al, Ind. Eng. Chem. Prod. Res. Dev. 1982, 21, 59-63 (Year: 1982).*
STIC database search report 1 (Year: NA).*
STIC database search report 2 (Year: NA).*
Extended European Search Report for EP Patent Application No. 15156517.3, dated Sep. 24, 2015, 9 pages.
Michael J. Simons, "Hydrophobically Modified Polyethyleneimines and Ethoxylated Polyethyleneimines", Wright State University, Aug. 8, 2007, pp. 1-60.
International Search Report and Written Opinion for International Application No. PCT/EP2016/053210, dated Apr. 25, 2016, 13 pages.
Von Preussmann et al., Arzneimit-telforschung 1969, 19, 1059.
Ethoxylated Polyethyleneimines et al, "Hydrophobically Modified Polyethleneimines and", Aug. 8, 2007, pp. 1-60.

* cited by examiner

*Primary Examiner* — Irina Krylova
(74) *Attorney, Agent, or Firm* — Armstrong Teasdale LLP

(57) ABSTRACT

Process for cleaning soiled metal surfaces characterized in such cleaning is carried out using a composition that comprises at least one alkoxylated polyethylenimine (B) with a polydispersity $Q=M_w/M_n$ of at least 3.5 and an average molecular weight $M_w$ in the range of from 2,500 to 1,500,000 g/mol.

11 Claims, No Drawings

US 10,907,259 B2

PROCESS FOR CLEANING SOILED METAL SURFACES AND SUBSTANCES USEFUL FOR SUCH PROCESS

CROSS-REFERENCE TO RELATED APPLICATIONS

This application is a U.S. National Phase Application of PCT/EP2016/053210, filed Feb. 16, 2016, which claims the benefit of priority to European Patent Application No. 15156517.3, filed Feb. 25, 2015, the entire contents of which are hereby incorporated by reference herein.

BACKGROUND

The present invention is directed towards a process for cleaning soiled metal surfaces characterized in such cleaning is carried out using a composition that comprises at least one alkoxylated polyethylenimine (B) with a polydispersity $Q=M_w/M_n$, of at least 3.5 and an average molecular weight $M_w$, in the range of from 2,500 to 1,500,000 g/mol, wherein the molecular weight distribution of the at least one alkoxylated polyethylenimine (B) is bimodal or multimodal. Furthermore, the present invention is directed towards alkoxylated polyethylenimines (B) and a process to make such alkoxylated polyethylenimines (B). Furthermore, the present invention is directed towards uses and applications of alkoxylated polyethylenimines (B).

Alkoxylated polyethylenimines have found numerous applications such as, but not limited to dispersing pigments, furthermore as demulsifying agents and defoaming agents. The properties as pigment dispersants may be used in applications like hard surface cleaning including metal surface cleaning, furthermore fiber cleaning and oil field applications such as oil demulsification, see, e. g., U.S. Pat. Nos. 4,935,162 and 5,445,765.

In particular, polyethylenimines have been reported to serve as components in metal cleaners in the steel industry, see WO 2006/058570. The syntheses of polyethylenimines is described in, e.g., US 2012/0216949 and EP 1 817 398. However, especially when it comes to soiling with natural soils, the performance of various polyethylenimines containing formulations leaves room for improvement.

It was therefore an objective to provide a process of cleaning soiled metal surfaces and especially of metal surfaces soiled with matter based on nature-based pigments. It was furthermore an objective of the present invention to provide materials that are useful for despoiling hard surfaces, especially metal surfaces, especially from nature-derived soil. It was furthermore an objective to provide a process for making such materials.

Accordingly, the process defined at the outset has been defined.

DETAILED DESCRIPTION

In the context of the present invention, the process defined at the outset is also referred to as "inventive process" or as "process according to the present invention".

The inventive process is a process for cleaning of soiled metal surfaces. Such cleaning may include partial or complete removal of soil, combined with, if applicable, partial or complete removal of corroded parts such as, for example, rust removal.

The metal surface to be cleaned may be soiled in part or completely. In a preferred embodiment of the present invention the respective metal surface is soiled with at least one pigment selected from silica, alumina, iron oxide and soot, preferably such pigment is selected from combinations of at least two of the foregoing.

Pigments may be man-made or nature-based. In a preferred embodiment of the present invention such pigment is selected from nature-based pigments. In many cases such nature-based pigments have a broad particle diameter distribution, and they are mixtures or combinations of different pigments.

The inventive process may be employed without or with mechanical support, preferably without. Mechanical support may be applied by a cloth or a brush or a combination of at least two brushes. In certain embodiments of the present invention, the inventive process is carried out with the aid of a pressure washer or a power washer or a jet-stream washer.

The inventive process includes the application of a composition that comprises at least one alkoxylated polyethylenimine (B) with a polydispersity $Q=M_w/M_n$ of at least 3.5 and an average molecular weight $M_w$ in the range of from 2,500 to 1,500,000 g/mol. Said polyethylenimine (B) may be alkoxylated with one or more $C_2$-$C_4$-alkylene oxides. In the context of the present invention said composition may also be referred to as inventive composition. The inventive composition may be solid or liquid or in the form of a foam, preferably the inventive composition is liquid. Such liquid may be in form of a clear solution or of a dispersion or slurry, preferably a clear solution.

The inventive composition comprises at least one polyethylenimine (A) with a polydispersity $Q=M_w/M_n$ of at least 3.5, preferably in the range of from 3.5 to 10, more preferably in the range of from 4 to 9 and even more preferably from 4.0 to 5.5.

The average molecular weight $M_w$ of alkoxylated polyethylenimine (B) is in the range of from 2,500 to 1,500,000 g/mol, preferably up to 500,000 g/mol and more preferably up to 100,000 g/mol. The average molecular weight $M_w$ of alkoxylated polyethylenimine (B) may be determined by gel permeation chromatography (GPC), with 1.5% by weight aqueous formic acid as eluent and cross-linked poly-hydroxyethylmethacrylate as stationary phase.

The backbones of alkoxylated polyethylenimines (B) are the respective polyethylenimines (A). Polyethylenimines (A) may be selected from linear, branched and highly branched polyethylenimines. In the context of the present invention, branched polyethylenimines (A) are characterized by their degree of branching (DB). The degree of branching can be determined, for example, by $^{13}$C-NMR spectroscopy, preferably in $D_2O$, and is defined as follows:

DB=D+T/D+T+L with D (dendritic) corresponding to the fraction of tertiary amino groups, L (linear) corresponding to the fraction of secondary amino groups and T (terminal) corresponding to the fraction of primary amino groups.

Within the context of the present invention, branched polyethylenimines (A) are polyethylenimines (A) with DB in the range from 0.1 to 0.95, preferably 0.25 to 0.90, particularly preferably in the range from 0.30 to 0.80% and very particularly preferably at least 0.5. Polyethylenimine (A) may be monomodal, bimodal or multimodal with respect to the molecular weight distribution, bimodal and multimodal being preferred. More details are described further down below.

Alkoxylated polyethylenimines (B) are alkoxylated with at least one alkylene oxide, preferably with at least one $C_2$-$C_4$-alkylene oxide. In embodiments in which more one alkylene oxide has been used for alkoxylation, the different alkylene units may be arranged randomly or block-wise.

Examples of $C_2$-$C_4$-alkylene oxides are ethylene oxides, propylene oxide, 1,2-butylene oxide and 1,4-butylene oxide and combinations of at least two of the foregoing. Preferred are ethylene oxide, propylene oxide and combinations of ethylene oxide and propylene oxide.

In one embodiment of the present invention, alkoxylated polyethylenimine (B) is alkoxylated with ethylene oxide and one or more $C_3$-$C_4$-alkylene oxides, and wherein the alkylene oxides are arranged blockwise.

In embodiments wherein inventive alkoxylated polyethylenimines (B) have been made by alkoxylation of polyethylenimine (A) with a combination of two or more $C_2$-$C_4$-alkylene oxides, for example in ethoxylated/propoxylated polyethylenimines (B), such alkylenoxide units may be arranged randomly or block-wise in inventive alkoxylated polyethylenimines (B), block-wise being preferred.

In one embodiment of the present invention, alkoxylated polyethylenimine (B) contains backbone and alkylene oxide units in a weight ratio in the range of from 4:1 to 1:100, preferably 1:2 to 1:50.

Inventive compositions may be solvent-based or aqueous compositions. The term "solvent-based compositions" refer to compositions in which the continuous phase is a liquid of which 50% by volume or more are an organic solvent or a combination of organic solvents. The term "aqueous compositions" refers to compositions in which the continuous phase is a liquid of which more than 50% by volume are water. Examples of organic solvents are ethanol, isopropanol, propylene glycol (1,2-propanol), ethylene glycol, neopentyl glycol (2,2-dimethyl 1,3-propandiol). Organic solvents in the context of the present invention are liquids at ambient temperature.

In one embodiment of the present invention the inventive process is being carried out at a temperature in the range of from ambient temperature to 70° C., preferably from ambient temperature to 40° C.

In one embodiment of the present invention, inventive compositions contain in the range of from 0.1 to 10% by weight of alkoxylated polyethylenimine (B).

The inventive process leads to excellent cleaning results. Soil and preferably pigment-based soil, and in particular nature-based pigments can be removed easily and to a major extent from metal surfaces. Rust may be at least partially removed from the respective metal surface. It was found in addition that by performing the inventive process pigments are dispersed very well and their tendency to re-deposition is low.

A further aspect of the present invention are alkoxylated polyethylenimines (B), hereinafter also being referred to as inventive alkoxylated polyethylenimines (B) or as alkoxylated polyethylenimines (B) according to the present invention or briefly as alkoxylated polyethylenimines (B). The average molecular weight $M_w$ of alkoxylated polyethylenimine (B) is in the range of from 2,500 to 1,500,000 g/mol, preferably up to 500,000 g/mol and more preferably up to 100,000 g/mol. The average molecular weight $M_w$ of alkoxylated polyethylenimine (B) may be determined by gel permeation chromatography (GPC), with 1.5% by weight aqueous formic acid as eluent and cross-linked poly-hydroxyethylmethacrylate as stationary phase.

Inventive alkoxylated polyethylenimines (B) display a polydispersity $Q=M_w/M_n$ of at least 3.5, preferably in the range of from 3.5 to 10, more preferably in the range of from 4 to 9 and even more preferably from 4.0 to 5.5.

In one embodiment of the present invention, inventive alkoxylated polyethylenimine (B) is selected from those with alkylene oxide units and N atoms in a molar ratio in the range of from 1:1 to 100:1, preferably in the range of from 2:1 to 50:1, the N atoms resulting from alkylenimine units. The alkylenimine units are ethylenimine units in their majority, for example at least 60 mol-%, referring to the total of alkylenimine units, preferably at least 70 mol-%.

In a special embodiment of the present invention, inventive alkoxylated polyethylenimine (B) is selected from those with alkylene oxide units and N atoms in a molar ratio in the range of from 1:1 to 100:1, preferably in the range of from 2:1 to 50:1, the N atoms resulting from ethylenimine units, and no alkylenimine units other than propylenimine units being present.

In one embodiment of the present invention the average molecular weight (number average) of inventive alkoxylated polyethylenimine (B) is in the range of from 2,500 to 1,500,000 g/mol, determined by GPC, preferably up to 500,000 g/mol.

In one embodiment of the present invention the average molecular weight $M_w$ of inventive alkoxylated polyethylenimine is up to 500,000 g/mol and preferably up to 100,000 g/mol.

Inventive alkoxylated polyethylenimines (B) can be conveniently made by alkoxylation of polyethylenimines (A). Polyethylenimines (A) will be described in more detail below.

Polyethylenimines (A) display a polydispersity $Q=M_w/M_n$ of at least 3.5 and an average molecular weight $M_w$ in the range of from 2,000 to 1,000,000 g/mol.

Polyethylenimines (A) display a polydispersity $Q=M_w/M_n$ of at least 3.5, preferably in the range of from 3.5 to 10, more preferably in the range of from 4 to 9 and even more preferably from 4.0 to 5.5.

The average molecular weight $M_w$ of polyethylenimines (A) is in the range of from 550 to 100,000 g/mol, preferably up to 50,000 g/mol and more preferably from 800 up to 25,000 g/mol. The average molecular weight $M_w$ of polyethylenimine (A) may be determined by gel permeation chromatography (GPC), with 1.5% by weight aqueous formic acid as eluent and cross-linked poly-hydroxyethyl methacrylate as stationary phase.

The term "polyethylenimines" in the context of the present invention does not only refer to polyethylenimine homopolymers but also to polyalkylenimines containing NH—$CH_2$—$CH_2$—NH structural elements together with other alkylene diamine structural elements, for example NH—$CH_2$—$CH_2$—$CH_2$—NH structural elements, NH—$CH_2$—$CH(CH_3)$—NH structural elements, NH—$(CH_2)_4$—NH structural elements, NH—$(CH_2)_6$—NH structural elements or (NH—$(CH_2)_8$—NH structural elements but the NH$CH_2$—$CH_2$—NH structural elements being in the majority with respect to the molar share. Preferred polyethylenimines contain NH—$CH_2$—$CH_2$—NH structural elements being in the majority with respect to the molar share, for example amounting to 60 mol-% or more, more preferably amounting to at least 70 mol-%, referring to all alkylenimine structural elements. In a special embodiment, the term polyethylenimine refers to those polyalkylenimines that bear only one or zero alkylenimine structural element per molecule that is different from NH—$CH_2$—$CH_2$—NH.

Branches may be alkylenamino groups such as, but not limited to —$CH_2$—$CH_2$—$NH_2$ groups or $(CH_2)_3$—$NH_2$-groups. Longer branches may be, for examples, —$(CH_2)_3$—$N(CH_2CH_2CH_2NH_2)_2$ or —$(CH_2)_2$—$N(CH_2CH_2NH_2)_2$ groups. Highly branched polyethylenimines are, e.g., polyethylenimine dendrimers or related molecules with a degree of branching in the range from 0.25 to 0.95, preferably in the range from 0.30 to 0.80 and particularly preferably at least 0.5. The degree of branching can be determined for example by $^{13}$C-NMR or $^{15}$N-NMR spectroscopy, preferably in $D_2O$, and is defined as follows:

$$DB=D+T/D+T+L$$

with D (dendritic) corresponding to the fraction of tertiary amino groups, L (linear) corresponding to the fraction of secondary amino groups and T (terminal) corresponding to the fraction of primary amino groups.

Within the context of the present invention, branched polyethylenimines (A) are polyethylenimines (A) with DB in the range from 0.25 to 0.95, particularly preferably in the range from 0.30 to 0.90% and very particularly preferably at least 0.5.

In the context of the present invention, $CH_3$-groups are not being considered as branches.

Preferred polyethylenimines (A) are those that exhibit little or no branching, thus predominantly linear or linear polyethylenimine backbones.

Polyethylenimines (A) are preferably made in a semi-discontinuous process in a single reactor or in a combination of a plug flow reactor and a semi-discontinuous tank reactor. In other embodiments, polyethylenimines (A) are made by combining two or polyethylenimines with different average molecular weight, for examples the maxima in $M_w$ having a difference in the range of from 5,000 to 1,000,000 g/mol.

A process to make polyethylenimine (A) preferably comprises the following steps:
- (a1) charging a reactor with water, an amine or diamine and an initiator selected from $CO_2$, Brönsted acids and alkyl halides,
- (a2) adding ethylenimine and, optionally, at least one substituted aziridine under polymerization conditions but without further addition of initiator, amine and water,
- (a3) stopping the addition of ethylene oxide and of said optional one substituted aziridine at a conversion of at least 99% or after 5 to 30 hours,
- (a4) maintaining the reaction mixture at reaction conditions for at least 2 hours.

Examples of amines useful in step (a1) are selected from aliphatic monoamines. Specific examples are methylamine, dimethylamine, ethylamine, diethylamine, 1-propylamine, 2-propylamine. Examples of diamines are aliphatic and cycloaliphatic and aromatic diamines such as 1,2-diaminoethane, 1,3-diaminopropane, 1,4-diaminobutane, 1,6-diaminohexane, 1,8-diaminooctane, 3,3-dimethylaminopropylamine, isophoronediamine, 4,4'-diaminodiphenylmethane, 1,4-bis(3-aminopropyl)piperazine, 4,9-dioxadodecane-1,12-diamine, 4,7,10-trioxatridecane-1,13-diamine, and certain oligomers of ethylendiamine such as diethylenetriamine and triethylenetetramine. Preference is given to methylamine, dimethylamine, ethylamine, diethylamine, propylamine, 1,2-diaminoethane, diethylenetriamine, triethylenetetramine or 3,3-dimethylaminopropylamine, especially 1,2-diaminoethane (other term: ethylenediamine).

Suitable initiators added in step (a1) are carbon dioxide, Brönsted acids such as, but not limited to sulphuric acid, methanesulfonic acid, and organic acids such as formic acid, acetic acid, benzoic acid, and furthermore alkyl halide such as, but not limited to butyl chloride, for example n-chlorbutane and tert.-butyl chloride, the term alkyl halides also encompassing aliphatic dihalides such as 1,2-dichloroethane.

In one embodiment, in steps (a1) and (a2) from zero up to 50% by weight of water are used, referring to total aziridine, preferably up to 20% by weight.

In one embodiment, in steps (a1) and (a2) in the range of from 0.01 up to 10% by weight, preferably 0.5 up to 5% by weight of amine or diamine, respectively, are used, referring to total aziridine.

In one embodiment, in steps (a1) and (a2) in total from 10 ppm up to 10% by weight of $CO_2$, Brönsted acid or alkyl halide are used, referring to total aziridine, preferably 2 up to 8% by weight.

In step (a2), ethylenimine is added and, optionally, at least one substituted aziridine such as, but not limited to, 2-methylaziridine, 1-(2-hydroxyethyl)aziridine and 1-(2-aminoethyl)aziridine. In embodiments wherein a mixture of ethylenimine and at least one substituted aziridine are added in step (a2), the molar percentage of ethylenimine is at least 50%.

The addition according to step (a2) is performed under polymerization conditions. Polymerization conditions refer to a temperature in the range of from 60 to 200° C., preferably 88 to 180° C. The pressure is preferably in the range of from 1 to 50 bar, preferably 2 to 10 bar.

During step (a2), neither further initiator nor further amine(s) are being added. Water is not added, either. The residual humidity of ethylenimine, if any, is not counted as water addition in the context of the present invention.

In one embodiment of the present invention, the duration of step (a2) is in the range of from 2 to 30 hours, preferably at least 5 hours. The residual monomer content is preferably 1 ppm or less after completion of (a2). The residual comonomer content may be determined with 4-(para-nitrobenzyl) pyridine, according to the Preussmann Test, see von Preussmann et al., *Arzneimittelforschung* 1969, 19, 1059.

In a preferred embodiment of the present invention, synthesis of polyethylenimine (A) is performed in a tubular reactor combined with a semi-continuously operated tank reactor.

In one embodiment of the present invention, the molecular weight distribution of polyethylenimine (A) is bimodal or multimodal.

In one embodiment of the present polyethylenimines (A) have a primary amine value in the range of from 1 to 1000 mg KOH/g, preferably from 10 to 500 mg KOH/g, most preferred from 50 to 300 mg KOH/g. The primary amine value can be determined according to ASTM D2074-07.

In one embodiment of the present invention polyethylenimines (A) have a secondary amine value in the range of from 10 to 1000 mg KOH/g, preferably from 50 to 500 mg KOH/g, most preferred from 50 to 500 mg KOH/g. The secondary amine value can be determined according to ASTM D2074-07.

In one embodiment of the present invention polyethylenimines (A) have a tertiary amine value in the range of from 1 to 300 mg KOH/g, preferably from 5 to 200 mg KOH/g, most preferred from 10 to 100 mg KOH/g. The tertiary amine value can be determined according to ASTM D2074-07.

In one embodiment of the present invention, the molar share of tertiary N atoms is determined by $^{15}$N-NMR spectroscopy. In cases that tertiary amine value and result according to $^{13}$C-NMR spectroscopy are inconsistent, the results obtained by $^{13}$C-NMR spectroscopy will be given preference.

In a special embodiment of the present invention, especially when it is desired to apply inventive alkoxylated polyethylenimine (B) under acidic conditions, alkoxylated polyethylenimine (B) may be protonated or at least partially protonated and bear a counterion. Non-limiting examples of suitable counterions are sulfate and monomethylsulfate, monomethylsulfate being preferred.

Another aspect of the present invention is directed towards alkoxylated polyethylenimines (B) having as a backbone a polyethylenimine (A) that has been made according to the following process
(a) making a polyethylenimine (A) semi-discontinuously in one reactor, and
(b) reacting polyethylenimine (A) with at least one $C_2$-$C_4$-alkylene oxide in the presence of a base.

Inventive alkoxylated polyethylenimines are particularly useful for the inventive process, and they are particularly useful ingredients of inventive compositions.

A further aspect of the present invention refers to a process for making inventive alkoxylated polyethylenimines (B), in the context of the present invention also being referred to as inventive two-step process. The inventive two-step process comprises the steps of
(a) providing a polyethylenimine (A, and
(b) reacting polyethylenimine (A) with at least one $C_2$-$C_4$-alkylene oxide in the presence of a base.

Polyethylenimines (A) and processes of their manufacture are described above. In step (a), such polyethylenimine (A) may be provided in bulk or in solution, in bulk being preferred.

Step (b) of the inventive two-step process comprises reacting the polypropylenimine provided in step (a) with at least one $C_2$-$C_4$-alkylene oxide, for example ethylene oxide, propylene oxide, butylene oxide, or mixtures of at least two alkylene oxides of the foregoing. Preference is given to ethylene oxide, 1,2-propylene oxide and mixtures of ethylene oxide and 1,2-propylene oxide. If mixtures of at least two alkylene oxides are applied, they can be reacted stepwise or simultaneously.

Step (b) of the inventive two-step process is carried out in the presence of a base. Suitable bases such as potassium hydroxide, sodium hydroxide, sodium or potassium alkoxides such as potassium methylate ($KOCH_3$), potassium tert-butoxide, sodium ethoxide and sodium methylate ($NaOCH_3$), preferably from potassium hydroxide and sodium hydroxide. Further examples of catalysts are alkali metal hydrides and alkaline earth metal hydrides such as sodium hydride and calcium hydride, and alkali metal carbonates such as sodium carbonate and potassium carbonate. Preference is given to the alkali metal hydroxides and the alkali metal alkoxides, particular preference being given to potassium hydroxide and sodium hydroxide. Typical use amounts for the base are from 0.05 to 10% by weight, in particular from 0.5 to 2% by weight, based on the total amount of polyethylenimine (A) and $C_2$-$C_4$-alkylene oxide.

In one embodiment of the present invention, step (b) of the inventive two-step process is carried out at temperatures in the range of from 90 to 240° C., preferably from 120 to 180° C., in a closed vessel.

In one embodiment of the present invention, step (b) of the inventive two-step process is carried out at a pressure in the range of from 1 to 10 bar, preferably 1 to 8 bar.

In one embodiment of the present invention, $C_2$-$C_4$-alkylene oxide(s) is/are introduced to polyethylenimine (A) and optionally to the catalyst under the vapour pressure of the alkylene oxide or of the respective mixture of $C_2$-$C_4$-alkylene oxides at the selected reaction temperature. $C_2$-$C_4$-Alkylene oxide(s) can be introduced in pure form or, as an alternative, be diluted up to 30 to 60% by volume with an inert gas such as a rare gas or nitrogen. This measure affords additional safety against explosion-like polyaddition of the $C_2$-$C_4$-alkylene oxide.

In case several $C_2$-$C_4$-alkylene oxides are being introduced polyether chains will be formed in which the different alkylene oxide units are distributed virtually randomly. Variations in the distribution of the units along the polyether chain can arise due to differing reaction rates of $C_2$-$C_4$-alkylene oxides. Variations in the distribution of the units along the polyether chain can be achieved arbitrarily by continuously introducing an alkylene oxide mixture of program-controlled composition as well. In case different $C_2$-$C_4$-alkylene oxides are reacted subsequently, then polyether chains with a block-type distribution of the alkylene oxide units are obtained.

In a preferred embodiment of the present invention, step (b) of the inventive two-step process can consist of two or more sub-steps, of which the first sub-step consists in initially undertaking only an incipient alkoxylation of polyethylenimine (A). In the incipient alkoxylation, polyethylenimine (A) is reacted with a portion of the total amount of $C_2$-$C_4$-alkylene oxide used that corresponds to 0.9 to 1 mole of alkylene oxide per mole of NH moiety. The incipient alkoxylation is generally undertaken in the absence of a catalyst, preferably in an aqueous solution.

In one embodiment of the present invention, the incipient alkoxylation can be performed at a reaction temperature from 70 to 200° C., preferably from 80 to 160° C.

In one embodiment of the present invention, the incipient alkoxylation may be affected at a pressure of up to 10 bar, preferably up to 8 bar.

In a second sub-step and—optionally, in subsequent sub-steps—the further alkoxylation is then effected by subsequent reaction with $C_2$-$C_4$-alkylene oxide(s). The further alkoxylation is typically undertaken in the presence of a catalyst.

The second sub-step—and the optional subsequent sub-steps—may each be undertaken in bulk, embodiment (i), or in an organic solvent, embodiment (ii). In embodiment (i), water can be removed from the aqueous solution of the incipiently alkoxylated polyethylenimine (A). Such water removal can be done by heating to a temperature in the range of from 80 to 150° C. under a reduced pressure in the range of from 0.01 to 0.5 bar and distilling off the water.

In one embodiment of the present invention, the subsequent reaction with $C_2$-$C_4$-alkylene oxide(s) is effected typically at a reaction temperature in the range of from 70 to 200° C. and preferably from 100 to 180° C.

In one embodiment of the present invention, the subsequent reaction with $C_2$-$C_4$-alkylene oxide(s) is effected typically at a pressure of up to 10 bar and in particular up to 8 bar.

In one embodiment of the present invention, the reaction time of the subsequent reaction with $C_2$-$C_4$-alkylene oxide(s) is generally in the range of from 0.5 to 12 hours.

Examples of suitable organic solvents for embodiment (ii) are nonpolar and polar aprotic organic solvents. Examples of particularly suitable nonpolar aprotic solvents include aliphatic and aromatic hydrocarbons such as hexane, cyclohexane, toluene and xylene. Examples of particularly suitable polar aprotic solvents are ethers, in particular cyclic ethers such as tetrahydrofuran and 1,4-dioxane, furthermore N,N-dialkylamides such as dimethylformamide and dimethylacetamide, and N-alkyllactams such as N-methylpyrrolidone. It is as well possible to use mixtures of at least two of the above organic solvents. Preferred organic solvents are xylene and toluene.

In embodiment (ii), the solution obtained in the first step, before or after addition of catalyst and solvent, is dewatered before being subjected to alkylene oxide, said water removal advantageously being done by removing the water at a temperature in the range of from 120 to 180° C., preferably supported by a stream of nitrogen. The subsequent reaction with the alkylene oxide may be effected as in embodiment (i). In embodiment (i), the alkoxylated polyethylenimines (B) according to the invention is obtained directly in bulk and may be dissolved in water, if desired. In embodiment (ii), organic solvent is typically replaced by water. Alkoxylated polyethylenimines (B) according to the invention may alternatively be isolated in bulk.

After step (b) of the inventive two-step process alkoxylated polyethylenimine (B) according to the invention is obtained.

A further aspect of the present invention is directed towards aqueous compositions containing at least one inventive alkoxylated polyethylenimine (B). In the context of the present invention, such compositions are also referred to as inventive compositions or inventive aqueous compositions or (aqueous) compositions according to the present invention. Inventive compositions comprise
(i) at least one inventive alkoxylated polyethylenimine (B),
and, optionally, at least one further ingredient selected from
(ii) at least one cationic surfactant,
(iii) at least one non-ionic surfactant selected from polyalkoxylated $C_1$-$C_4$-alkanols, polyalkoxylated fatty alkohols and polyalkoxylated phenols.

Inventive alkoxylated polyethylenimines (B) are described above.

Cationic surfactants (ii) are surfactants that bear at least one net cationic charge per molecule. Such cationic charge may be independent of the pH value or at low pH value, for example at a pH value of 4 or less. Examples of cationic surfactants are quaternary ammonium salts wherein the N atom bears at least one $C_{10}$-$C_{40}$-alkyl group or at least one $C_{10}$-$C_{40}$-alkene group, for example lauryldimethylbenzylammonium chloride, lauryltrimethylammomium chloride, n-$C_{16}H_{33}$—N(CH$_3$)$_3$ chloride, mono-$C_{10}$-$C_{25}$-alkylammonium salts, and N-dimethyl-N—($C_7$-$C_{25}$-hydroxyalkyl)ammonium salts.

Suitable non-ionic surfactants (iii) are selected from polyalkoxylated $C_1$-$C_4$-alkanols and polyalkoxylated phenols. Preferably, polyalkoxlated $C_1$-$C_4$-alkanols and polyalkoxylated phenols are selected from polyethoxylated $C_1$-$C_4$-alkanols, polypropoxylated $C_1$-$C_4$-alkanols, polyethoxylated phenols and polypropoxylated phenols and $C_1$-$C_4$-alkanols alkoxylated with combinations of ethylene oxide and propylene oxide as well as phenols alkoxylated with combinations of ethylene oxide and propylene oxide, each with an average degree of polyalkoyxlation in the range of from 1 to 15, preferably up to 5. Specific examples are tripropylenglycol mono-n-butylether, dipropylenglycol mono-n-butylether, tripropylenglycol mono-methylether and propylenglycolmonophenyl ether.

Polyalkoxylated fatty alkohols are selected from polyalkoxylated $C_6$-$C_{22}$-alkanols and polyalkoxylated $C_6$-$C_{22}$-alkenols, preferably from polyalkoxylated $C_8$-$C_{18}$-alkanols and polyalkoxylated $C_6$-$C_{22}$-alkenols, said $C_6$-$C_{22}$-alkanols being branched or preferably linear. The degree of alkoxylation is preferably in the range of from 1.5 to 20. More preferred are polyethoxylated $C_6$-$C_{22}$-alkanols, polypropoxylated $C_6$-$C_{22}$-alkanols, polyethoxylated $C_6$-$C_{22}$-alkenols and polypropoxylated $C_6$-$C_{22}$-alkenols.

In one embodiment of the present invention, inventive aqueous compositions comprise
(i) in total in the range of from 0.1 to 10% by weight of polyethylenimine (A) and/or alkoxylated polyethylenimine (B), preferably up to 5% by weight and even more preferably 0.25 to 2% by weight,
(ii) optionally, 0.01 to 1% by weight of cationic surfactant, preferably 0.05 to 0.5% by weight,
(iii) optionally, 0.5 to 20% by weight of non-ionic surfactant.

Percentages refer to the entire inventive composition.

Inventive compositions may be manufactured by mixing the respective components with water. The order of addition is not critical.

Another aspect of the present invention refers to the use of inventive alkoxylated polyethylenimines (B) for hard-surface cleaning and for fibre cleaning, hereinafter being referred to as inventive hard-surface cleaning and inventive fibre cleaning.

Inventive fibre-cleaning may also be referred to as laundering in the context of the present invention. Fibre cleaning includes both industrial ware-washing and home care applications. Compositions suitable for inventive fibre cleaning may also be referred to as inventive laundry detergent compositions. Inventive laundry detergent compositions may be liquid, gels, or solid compositions, solid embodiments encompassing, for example, powders and tablets. Liquid compositions may be packaged as unit doses.

Inventive laundry detergent compositions preferably comprise at least one at least on anionic surfactant (C) and at least one builder (D). Suitable builders (D) may be selected from selected from citrate, phosphates, silicates, carbonates, phosphonates, amino carboxylates and polycarboxylates.

In one embodiment of the present invention, inventive laundry detergents comprise, percentages each time referring to the total solids content of the respective laundry detergent:
(i) in the range of from 0.1 to 15% by weight of alkoxylated polyethylenimine (B), preferably up to 5% by weight and even more preferably 0.25 to 2.5% by weight,
(ii) in total in the range of from 1 to 60% by weight of anionic surfactant(s) (C), preferably 15 to 25% by weight,
(iii) in total in the range of from 1 to 20% by weight of builder, preferably 2.5 to 15% by weight.

Examples of suitable anionic surfactants (C) are alkali metal and ammonium salts of $C_8$-$C_{12}$-alkyl sulfates, of $C_{12}$-$C_{18}$-fatty alcohol ether sulfates, of $C_{12}$-$C_{18}$-fatty alcohol polyether sulfates, of sulfuric acid half-esters of ethoxylated $C_4$-$C_{12}$-alkylphenols (ethoxylation: 3 to 50 mol of ethylene oxide/mol), of $C_{12}$-$C_{18}$-alkylsulfonic acids, of $C_{12}$-$C_{18}$ sulfo fatty acid alkyl esters, for example of $C_{12}$-$C_{18}$ sulfo fatty acid methyl esters, of $C_{10}$-$C_{18}$-alkylarylsulfonic acids, preferably of n-$C_{10}$-$C_{18}$-alkylbenzene sulfonic acids, of $C_{10}$-$C_{18}$ alkyl alkoxy carboxylates and of soaps such as for example $C_8$-$C_{24}$-carboxylic acids. Preference is given to the alkali metal salts of the aforementioned compounds, particularly preferably the sodium salts.

In one embodiment of the present invention, anionic surfactants (C) are selected from n-$C_{10}$-$C_{18}$-alkylbenzene sulfonic acids and from fatty alcohol polyether sulfates, which, within the context of the present invention, are in particular sulfuric acid half-esters of ethoxylated $C_{12}$-$C_{18}$-alkanols (ethoxylation: 1 to 50 mol of ethylene oxide/mol), preferably of n-$C_{12}$-$C_{18}$-alkanols.

Examples of builders (D) are complexing agents, hereinafter also referred to as complexing agents (D), ion exchange compounds, and precipitating agents (D). Examples of builders (D) are citrate, phosphates, silicates, carbonates, phosphonates, amino carboxylates and polycarboxylates.

Examples of complexing agents (D) ("sequestrants") are selected from complexing agents such as, but not limited to citrate, phosphates, phosphonates, silicates, and ethylene amine derivatives selected from ethylene diamine tetraacetate, diethylene pentamine pentaacetate, methylglycine diacetate, and glutamine diacetate. Complexing agents (D) will be described in more details below.

Examples of precipitating agents (D) are sodium carbonate and potassium carbonate.

In one embodiment of the present invention, the use according to the invention comprises the use of alkoxylated polyethylenimine (B) together with at least one enzyme (E). Useful enzymes are, for example, one or more lipases, hydrolases, amylases, proteases, cellulases, hemicellulases, phospholipases, esterases, pectinases, lactases and peroxidases, and combinations of at least two of the foregoing types of the foregoing.

The use according to the invention can deal with any type of laundry, and with any type of fibres. Fibres can be of natural or synthetic origin, or they can be mixtures of natural of natural and synthetic fibres. Examples of fibres of natural origin are cotton and wool. Examples for fibres of synthetic origin are polyurethane fibres such as Spandex® or Lycra®, polyester fibres, or polyamide fibres. Fibres may be single fibres or parts of textiles such as knitwear, wovens, or nonwovens.

The use according to the invention can be performed by applying alkoxylated polyethylenimine (B) as a liquid, for example as a solution or gel, as a foam or as solid to fibres. It is preferred to use alkoxylate (A) in a washing liquor. Before application, it can be stored in a formulation that may be solid or liquid, liquid being preferred.

Preferably, the use according to the invention can be performed for cleaning, for example for de-soiling, degreasing, or the like of laundry. The soil or dirt to be removed can be proteins, grease, fat, oil, sebum, non-polar soils like soot and by-products of incomplete hydrocarbon combustion, particulate stains such as pigments and clays, or mixtures of at least two of the foregoing. Particularly preferred is the use according to the invention for grease removal (degreasing) and clay soil removal/anti re-deposition.

It is preferred to use inventive alkoxylated polyethylenimine (B) at a temperature in the range of from 15 to 90° C., preferably in the range of from 20 to 60° C.

The use according to the invention can be performed manually but it is preferred to apply or inventive alkoxylated polyethylenimine (B) mechanically, for example in a washing machine.

Laundry detergent compositions according to the invention may comprise at least one builder (D). In the context of the present invention, no distinction will be made between builders and such components elsewhere called "co-builders". Examples of builders (D) are complexing agents, hereinafter also referred to as complexing agents (D), ion exchange compounds, and precipitating agents (D). Builders are selected from citrate, phosphates, silicates, carbonates, phosphonates, amino carboxylates and polycarboxylates.

In the context of the present invention, the term citrate includes the mono- and the dialkali metal salts and in particular the mono- and preferably the trisodium salt of citric acid, ammonium or substituted ammonium salts of citric acid as well as citric acid. Citrate can be used as the anhydrous compound or as the hydrate, for example as sodium citrate dihydrate. Quantities of citrate are calculated referring to anhydrous trisodium citrate.

The term phosphate includes sodium metaphosphate, sodium orthophosphate, sodium hydrogenphosphate, sodium pyrophosphate and polyphosphates such as sodium tripolyphosphate. Preferably, however, the composition according to the invention is free from phosphates and polyphosphates, with hydrogenphosphates being subsumed, for example free from trisodium phosphate, pentasodium tripolyphosphate and hexasodium metaphosphate ("phosphate-free"). In connection with phosphates and polyphosphates, "free from" should be understood within the context of the present invention as meaning that the content of phosphate and polyphosphate is in total in the range from 10 ppm to 0.2% by weight of the respective composition, determined by gravimetry.

The term carbonates includes alkali metal carbonates and alkali metal hydrogen carbonates, preferred are the sodium salts. Particularly preferred is $Na_2CO_3$.

Examples of phosphonates are hydroxyalkanephosphonates and aminoalkanephosphonates. Among the hydroxyalkanephosphonates, the 1-hydroxyethane-1,1-diphosphonate (HEDP) is of particular importance as builder. It is preferably used as sodium salt, the disodium salt being neutral and the tetrasodium salt being alkaline (pH 9). Suitable aminoalkanephosphonates are preferably ethylenediaminetetramethylenephosphonate (EDTMP), diethylenetriaminepentamethylenphosphonate (DTPMP), and also their higher homologues. They are preferably used in the form of the neutrally reacting sodium salts, e.g. as hexasodium salt of EDTMP or as hepta- and octa-sodium salts of DTPMP.

Examples of amino carboxylates and polycarboxylates are nitrilotriacetates, ethylene diamine tetraacetate, diethylene triamine pentaacetate, triethylene tetraamine hexaacetate, propylene diamines tetraacetic acid, ethanol-diglycines, methylglycine diacetate (MGDA), and glutamic acid diacetate (GLDA). The term amino carboxylates and polycarboxylates also include their respective non-substituted or substituted ammonium salts and the alkali metal salts such as the sodium salts, in particular of the respective fully neutralized compound.

Silicates in the context of the present invention include in particular sodium disilicate and sodium metasilicate, alumosilicates such as for example zeolites and sheet silicates, in particular those of the formula $\alpha$-$Na_2Si_2O_5$, $\beta$-$Na_2Si_2O_5$, and $\delta$-$Na_2Si_2O_5$.

Compositions according to the invention may contain one or more builder selected from materials not being mentioned above. Examples of builders are $\alpha$-hydroxypropionic acid and oxidized starch.

In one embodiment of the present invention, builder (D) is selected from polycarboxylates. The term "polycarboxylates" includes non-polymeric polycarboxylates such as succinic acid, $C_2$-$C_{16}$-alkyl disuccinates, $C_2$-$C_{16}$-alkenyl disuccinates, ethylene diamine N,N'-disuccinic acid, tartaric acid diacetate, alkali metal malonates, tartaric acid monoacetate, propanetricarboxylic acid, butanetetracarboxylic acid and cyclopentanetetracarboxylic acid.

Oligomeric or polymeric polycarboxylates are for example polyaspartic acid or in particular alkali metal salts of (meth)acrylic acid homopolymers or (meth)acrylic acid copolymers.

Suitable comonomers are monoethylenically unsaturated dicarboxylic acids such as maleic acid, fumaric acid, maleic anhydride, itaconic acid and citraconic acid. A suitable polymer is in particular polyacrylic acid, which preferably has an average molecular weight $M_w$ in the range from 2000 to 40 000 g/mol, preferably 2000 to 10 000 g/mol, in particular 3000 to 8000 g/mol. Also of suitability are copolymeric polycarboxylates, in particular those of acrylic acid with methacrylic acid and of acrylic acid or methacrylic acid with maleic acid and/or fumaric acid.

It is also possible to use copolymers of at least one monomer from the group consisting of monoethylenically unsaturated $C_3$-$C_{10}$-mono- or $C_4$-$C_{10}$-dicarboxylic acids or anhydrides thereof, such as maleic acid, maleic anhydride, acrylic acid, methacrylic acid, fumaric acid, itaconic acid and citraconic acid, with at least one hydrophilically or hydrophobically modified monomer as listed below.

Suitable hydrophobic monomers are, for example, isobutene, diisobutene, butene, pentene, hexene and styrene, olefins with 10 or more carbon atoms or mixtures thereof, such as, for example, 1-decene, 1-dodecene, 1-tetradecene, 1-hexadecene, 1-octadecene, 1-eicosene, 1-docosene, 1-tetracosene and 1-hexacosene, $C_{22}$-α-olefin, a mixture of $C_{20}$-$C_{24}$-α-olefins and polyisobutene having on average 12 to 100 carbon atoms per molecule.

Suitable hydrophilic monomers are monomers with sulfonate or phosphonate groups, and also nonionic monomers with hydroxyl function or alkylene oxide groups. By way of example, mention may be made of: allyl alcohol, isoprenol, methoxypolyethylene glycol (meth)acrylate, methoxypolypropylene glycol (meth)acrylate, methoxypolybutylene glycol (meth)acrylate, methoxypoly(propylene oxide-co-ethylene oxide) (meth)acrylate, ethoxypolyethylene glycol (meth)acrylate, ethoxypolypropylene glycol (meth)acrylate, ethoxypolybutylene glycol (meth)acrylate and ethoxypoly(propylene oxide-co-ethylene oxide) (meth) acrylate. Polyalkylene glycols here can comprise 3 to 50, in particular 5 to 40 and especially 10 to 30 alkylene oxide units per molecule.

Particularly preferred sulfonic-acid-group-containing monomers here are 1-acrylamido-1-propanesulfonic acid, 2-acrylamido-2-propanesulfonic acid, 2-acrylamido-2-methylpropanesulfonic acid, 2-methacrylamido-2-methylpropanesulfonic acid, 3-methacrylamido-2-hydroxypropanesulfonic acid, allylsulfonic acid, methallylsulfonic acid, allyloxybenzenesulfonic acid, methallyloxybenzenesulfonic acid, 2-hydroxy-3-(2-propenyloxy)propanesulfonic acid, 2-methyl-2-propene-1-sulfonic acid, styrenesulfonic acid, vinylsulfonic acid, 3-sulfopropyl acrylate, 2-sulfoethyl methacrylate, 3-sulfopropyl methacrylate, sulfomethacrylamide, sulfomethylmethacrylamide, and salts of said acids, such as sodium, potassium or ammonium salts thereof.

Particularly preferred phosphonate-group-containing monomers are vinylphosphonic acid and its salts.

Moreover, amphoteric polymers can also be used as builders.

Compositions according to the invention can comprise, for example, in the range from in total 0.1 to 70% by weight, preferably 10 to 50% by weight, preferably up to 20% by weight, of builder(s) (D), especially in the case of solid formulations. Liquid formulations according to the invention preferably comprise in the range of from 0.1 to 8% by weight of builder (D).

Formulations according to the invention can comprise one or more alkali carriers. Alkali carriers ensure, for example, a pH of at least 9 if an alkaline pH is desired. Of suitability are, for example, the alkali metal carbonates, the alkali metal hydrogen carbonates, and alkali metal metasilicates mentioned above, and, additionally, alkali metal hydroxides. A preferred alkali metal is in each case potassium, particular preference being given to sodium.

Examples of useful enzymes (E) are one or more lipases, hydrolases, amylases, proteases, cellulases, hemicellulases, phospholipases, esterases, pectinases, lactases and peroxidases, and combinations of at least two of the foregoing types of the foregoing.

Enzyme (E) can be incorporated at levels sufficient to provide an effective amount for cleaning. The preferred amount is in the range from 0.001% to 5% of active enzyme by weight in the detergent composition according to the invention. Together with enzymes also enzyme stabilizing systems may be used such as for example calcium ions, boric acid, boronic acids, propylene glycol and short chain carboxylic acids. In the context of the present invention, short chain carboxylic acids are selected from monocarboxylic acids with 1 to 3 carbon atoms per molecule and from dicarboxylic acids with 2 to 6 carbon atoms per molecule. Preferred examples are formic acid, acetic acid, propionic acid, oxalic acid, succinic acid, $HOOC(CH_2)_3COOH$, adipic acid and mixtures from at least two of the foregoing, as well as the respective sodium and potassium salts.

Compositions according to the invention may comprise one or more bleaching agent (F) (bleaches).

Preferred bleaches (F) are selected from sodium perborate, anhydrous or, for example, as the monohydrate or as the tetrahydrate or so-called dihydrate, sodium percarbonate, anhydrous or, for example, as the monohydrate, and sodium persulfate, where the term "persulfate" in each case includes the salt of the peracid $H_2SO_5$ and also the peroxodisulfate.

In this connection, the alkali metal salts can in each case also be alkali metal hydrogen carbonate, alkali metal hydrogen perborate and alkali metal hydrogen persulfate. However, the dialkali metal salts are preferred in each case.

Formulations according to the invention can comprise one or more bleach catalysts. Bleach catalysts can be selected from oxaziridinium-based bleach catalysts, bleach-boosting transition metal salts or transition metal complexes such as, for example, manganese-, iron-, cobalt-, ruthenium- or molybdenum-salen complexes or carbonyl complexes. Manganese, iron, cobalt, ruthenium, molybdenum, titanium, vanadium and copper complexes with nitrogen-containing tripod ligands and also cobalt-, iron-, copper- and ruthenium-amine complexes can also be used as bleach catalysts.

Formulations according to the invention can comprise one or more bleach activators, for example tetraacetyl ethylene diamine, tetraacetylmethylenediamine, tetraacetylglycoluril, tetraacetylhexylenediamine, acylated phenolsulfonates such as for example n-nonanoyl- or isononanoyloxybenzene sulfonates, N-methylmorpholinium-acetonitrile salts ("MMA salts"), trimethylammonium acetonitrile salts, N-acylimides such as, for example, N-nonanoylsuccinimide, 1,5-diacetyl-2,2-dioxohexahydro-1,3,5-triazine ("DADHT") or nitrile quats (trimethylammonium acetonitrile salts).

Formulations according to the invention can comprise one or more corrosion inhibitors. In the present case, this is to be understood as including those compounds which inhibit the corrosion of metal. Examples of suitable corrosion inhibitors are triazoles, in particular benzotriazoles, bisbenzotriazoles, aminotriazoles, alkylaminotriazoles, also phenol derivatives such as, for example, hydroquinone, pyrocatechol, hydroxyhydroquinone, gallic acid, phloroglucinol or pyrogallol.

In one embodiment of the present invention, formulations according to the invention comprise in total in the range from 0.1 to 1.5% by weight of corrosion inhibitor.

Formulations according to the invention can comprise one or more builders, for example sodium sulfate.

Formulations according to the invention may comprise at least one additional surfactant, selected from non-ionic surfactants and amphoteric surfactants.

Non-Ionic Surfactants

Examples of surfactants are in particular nonionic surfactants. Preferred nonionic surfactants are alkoxylated alcohols and alkoxylated fatty alcohols, di- and multiblock copolymers of ethylene oxide and propylene oxide and reaction products of sorbitan with ethylene oxide or propylene oxide, furthermore alkylphenol ethoxylates, alkyl glycosides, polyhydroxy fatty acid amides (glucamides) and so-called amine oxides.

Preferred examples of alkoxylated alcohols and alkoxylated fatty alcohols are, for example, compounds of the general formula (I)

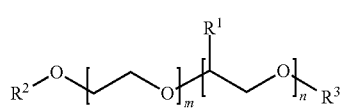
(I)

in which the variables are defined as follows:
$R^1$ is selected from linear $C_1$-$C_{10}$-alkyl, preferably ethyl and particularly preferably methyl,
$R^2$ is selected from $C_8$-$C_{22}$-alkyl, for example n-$C_8H_{17}$, n-$C_{10}H_{21}$, n-$C_{12}H_{25}$, n-$C_{14}H_{29}$, n-$C_{16}H_{33}$ or n-$C_{18}H_{37}$,
$R^3$ is selected from $C_1$-$C_{10}$-alkyl, methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, n-octyl, 2-ethylhexyl, n-nonyl, n-decyl or isodecyl,
m and n are in the range from zero to 300, where the sum of n and m is at least one. Preferably, m is in the range from 1 to 100 and n is in the range from 0 to 30.

Here, compounds of the general formula (I) may be block copolymers or random copolymers, preference being given to block copolymers.

Other preferred examples of alkoxylated alcohols and alkoxylated fatty alcohols are, for example, compounds of the general formula (II)

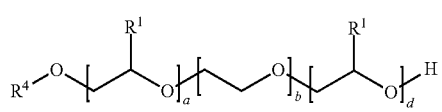
(II)

in which the variables are defined as follows:
$R^1$ is identical or different and selected from linear $C_1$-$C_4$-alkyl, preferably identical in each case and ethyl and particularly preferably methyl,
$R^4$ is selected from $C_6$-$C_{20}$-alkyl, in particular n-$C_8H_{17}$, n-$C_{10}H_{21}$, n-$C_{12}H_{25}$, n-$C_{14}H_{29}$, n-$C_{16}H_{33}$, n-$C_{18}H_{37}$,
a is a number in the range from zero to 6, preferably 1 to 6,
b is a number in the range from zero to 20, preferably 4 to 20,
d is a number in the range from 4 to 25.

Preferably, at least one of a and b is greater than zero.

Here, compounds of the general formula (II) may be block copolymers or random copolymers, preference being given to block copolymers.

Further suitable nonionic surfactants are selected from di- and multiblock copolymers, composed of ethylene oxide and propylene oxide. Further suitable nonionic surfactants are selected from ethoxylated or propoxylated sorbitan esters. Amine oxides such as lauryl dimethyl amine oxide ("lauramine oxide") or alkylphenol ethoxylates or alkyl polyglycosides or polyhydroxy fatty acid amides (glucamides) are likewise suitable. An overview of suitable further nonionic surfactants can be found in EP-A 0 851 023 and in DE-A 198 19 187.

Mixtures of two or more different nonionic surfactants may also be present.

Examples of amphoteric surfactants are $C_{12}$-$C_{18}$-alkylbetaines and sulfobetaines.

Further optional ingredients may be but are not limited to viscosity modifiers, cationic surfactants, foam boosting or foam reducing agents, perfumes, dyes, optical brighteners, dye transfer inhibiting agents and preservatives.

A further aspect of the present invention is a process for making a detergent composition according to the present invention, hereinafter also being referred to as process according to the invention. In order to perform the process according to the invention, components (A) or (B), anionic surfactant (C) and builder(s) (D) as defined above and, optionally, further components are being mixed together in the presence of water. The order of addition of the various ingredients is not critical but it is preferred to add the detergent(s) first and to add the enzyme(s) (E), if desired, as last component. Mixing can be accomplished, for example, by agitating or stirring. Said agitating or stirring can be performed until a clear solution or a homogeneous-looking dispersion has formed.

If solid detergent compositions are desired then the water can be removed, in whole or in part, for example by spray-drying, for example with the help of a spray nozzle.

The term hard-surface cleaning includes metal surface cleaning and cleaning of china, glassware, ceramics, stone, and wood. Preferred is dish-washing, and particularly preferred is automatic dishwash. Automatic dishwash compositions according to the present invention usually contain in the range of from 0.01 to 5% by weight, preferably 0.1 to 3% by weight of inventive alkoxylated polyethylenimine (B).

The use of inventive alkoxylated polyethylenimine (B) in laundry detergent compositions leads to reduced greying together with excellent overall washing results, in particular a low degree of re-deposition of soil.

A further aspect of the present invention refers to the use of inventive alkoxylated polyethylenimines (B) as demulgator. Demulgators can be used to break emulsions, for example for separating oil from aqueous emulsions. There is a need for highly efficient demulgators in various applications, for example in waste treatment and in oilfield applications.

Oilfield applications include the treatment of water-in-oil emulsions, the oil part being, for example, natural oil or refined oil, for example oil-based lubricant, gas, or kerosene.

In one embodiment of the present invention, inventive formulations used as demulgator(s) usually contain in the range of from 5 to 90% by weight active ingredient(s), preferably 25 to 75% by weight of active ingredients. When applying to water-in-oil emulsion in oil field application, it is preferred to apply 10 to 1,000 ppm inventive alkoxylated polyethylenimine (B), referring to the amount of natural oil or refined oil, as the case may be, preferably 150 to 500 ppm.

Inventive alkoxylated polyethylenimine may be applied together with an organic solvent, for example an aromatic hydrocarbon. Examples of suitable aromatic hydrocarbons are toluene and xylene, especially mixtures of isomeric xylenes.

Inventive formulations used in oilfield applications may contain one or more active ingredients other than inventive alkoxylated polyethylenimine (B). Examples of active ingredients other than inventive alkoxylated polyethylenimine (B) are (poly)alkoxylated fatty acids, especially (poly)ethoxylated $C_{12}$-$C_{30}$-carboxylic acids, (poly)alkoxylated fatty amines, especially (poly)ethoxylated $C_{10}$-$C_{30}$-alkylamines, polyalkyleneglycol esters and phenol-formaldehyde resins.

Inventive formulations are particularly useful in emulsion breaking, especially in oilfield applications.

The present invention is further explained by the following working examples.

WORKING EXAMPLES

General remarks:
Percentages refer to % by unless specifically defined otherwise.
I. Manufacture of Polyethylenimines (A)
I.1 Synthesis by Polymerization General remarks: the syntheses were performed in a continuously operated tubular reactor, length 18 m, inner diameter 3.5 mm. Said tubular reactor had two reaction zones. In the first reaction zone the temperature was kept at 125 to 130° C., in the second at 150° C. The first reaction zone was in the first 12 m, the second reaction zone in the remaining 6 m of the tubular reactor. The pressure was kept at 0.5 bar above the pressure necessary to keep the reaction mixture liquid, which requires a minimum of 1.5 bar.

Step (a1) was performed in a so-called mixing chamber, in which water, ethylenimine, aqueous $CO_2$ solution, and ethylendiamine were mixed through three static mixers. The mixture so obtained was then transferred into the tubular reactor.

The following starting materials were used:
Aziridine, provided as 25 wt-% aqueous solution
$CO_2$ as 2.5 wt % aqueous solution
1,2-ethylendiamine I.1.1 Synthesis of Polyethylenimine (A.1)

A premix was provided from $CO_2$ as 2.5 wt % aqueous solution and 1,2-ethylendiamine.

The tubular reactor described above was fed with a 360 g/h 25 wt-% aqueous solution of aziridine and the above premix in a way that a feed resulted in the addition of 17 g/h 2.5 wt % aqueous solution of $CO_2$ and 6.2 g/h 1,2-ethylendiamine were introduced into the tubular reactor. The feed had a temperature of 5° C. at the time of mixing. Through exothermic primary polymerization the temperature rose to 80 to 160° C. when entering the first reaction zone. At the end of the tubular reactor, the pressure was adjusted to 5 bar. The conversion of aziridine in the tubular reactor was 99 mol-%.

After having passed the tubular reactor, the reaction mixture was transferred into a semi-continuously operated tank reactor operated at 160° C. There, the polymerization was completed, step (a3). The average residence time was 2.5 hours in the stirred tank reactor hours. When the tank reactor was full the reaction was stopped by cooling to ambient temperature and pressure release. The water was removed, and polyethylenimine (A.1) was obtained.

I.1.2 Synthesis of Polyethylenimine (A.2)

A premix was provided from $CO_2$ as 2.5 wt % aqueous solution and 1,2-ethylendiamine. The tubular reactor described above was fed with a 310 g/h 25 wt-% aqueous solution of aziridine and the above premix in a way that a feed resulted in the addition of 4 g/h 2.5 wt % aqueous solution of $CO_2$ and 3.0 g/h 1,2-ethylendiamine were introduced into the tubular reactor. The feed had a temperature of 5° C. at the time of mixing. Through exothermic primary polymerization the temperature rose to 80 to 160° C. when entering the first reaction zone. At the end of the tubular reactor, the pressure was adjusted to 5 bar. The conversion of aziridine in the tubular reactor was 99 mol-%.

After having passed the tubular reactor, the reaction mixture was transferred into a semi-continuously operated tank reactor operated at 160° C. There, the polymerization was completed, step (a3). The average residence time was 4 hours in the stirred tank reactor hours. When the tank reactor was full the reaction was stopped by cooling to ambient temperature and pressure release. The water was removed, and polyethylenimine (A.2) was obtained.

I.1.3 Synthesis of Polyethylenimine (A.3)

A premix was provided from $CO_2$ as 2.5 wt % aqueous solution and 1,2-ethylendiamine. The tubular reactor described above was fed with a 285 g/h 25 wt-% aqueous solution of aziridine and the above premix in a way that a feed resulted in the addition of 2.8 g/h 2.5 wt % aqueous solution of $CO_2$ and 2.1 g/h 1,2-ethylendiamine were introduced into the tubular reactor. The feed had a temperature of 5° C. at the time of mixing. Through exothermic primary polymerization the temperature rose to 80 to 152° C. when entering the first reaction zone. At the end of the tubular reactor, the pressure was adjusted to 5 bar. The conversion of aziridine in the tubular reactor was 99 mol-%.

After having passed the tubular reactor, the reaction mixture was transferred into a semi-continuously operated tank reactor operated at 150° C. There, the polymerization was completed, step (a3). The average residence time was 4 hours in the stirred tank reactor hours. When the tank reactor was full the reaction was stopped by cooling to ambient temperature and pressure release. The water was removed, and polyethylenimine (A.3) was obtained.

I.2 Manufacture by Mixing of Two or More Polyethylenimines with a Molecular Weight Distribution Q in the Range of from 1.3 to 3.0

I.2.1 Manufacture of Polyethylenimine (A.7)

In a 1-litre glass flask, 250 g polyethylenimine (A.1) were mixed with 350 g polyethylenimine C-(A.4) at 80° C. with a propeller stirrer at 1200 rpm for 20 minutes. Polyethylenimine (A.7) was obtained.

I.2.2 Manufacture of Polyethylenimine (A.8)

In a 1-litre glass flask, 250 g polyethylenimine (A.2) were mixed with 350 g polyethylenimine C-(A.4) at 80° C. with a propeller stirrer at 1200 rpm for 20 minutes. Polyethylenimine (A.8) was obtained.

I.2.3 Manufacture of Polyethylenimine (A.9)

In a 1-litre glass flask, 400 g polyethylenimine (A.6) were mixed with 280 g polyethylenimine C-(A.4) at 80° C. with a propeller stirrer at 1200 rpm for 20 minutes. Polyethylenimine (A.9) was obtained.

The polyethylenimines (A) provided are summarized in Table 1.

TABLE 1

Polyethylenimines and their properties

|  | $M_w$ [g/mol] | $M_n$ [g/mol] | $M_w/M_n$ |
| --- | --- | --- | --- |
| (A.1) | 28,000 | 6,800 | 4.1 |
| (A.2) | 57,050 | 12,470 | 4.6 |
| (A.3) | 68,400 | 13,230 | 5.2 |
| C-(A.4) | 880 | 620 | 1.42 |
| C-(A.5) | 26,400 | 13,850 | 1.9 |
| C-(A.6) | 42,040 | 18,560 | 2.3 |
| (A.7) | 9,770 | 1,470 | 6.6 |
| (A.8) | 21,480 | 3,060 | 7.0 |
| (A.9) | 32,400 | 6,880 | 4.7 |

All molecular weights were determined by GPC with 1.5% by weight aqueous formic acid as eluent and cross-linked poly-hydroxyethylmethacrylate as stationary phase. Internal standard was a 0.05% by weight solution of tert.-butanol in 1.5% by weight aqueous formic acid. The column was calibrated with the aide of pullulan (α-1,4-; α-1,6-glucan) samples with known molecular weight.

II. Syntheses of Inventive Alkoxylated Polyethylenimines (B)

II.1 Synthesis

II.1.1 Synthesis of Inventive Alkoxylated Polyethylenimine (B1.1.1)

A 2-I autoclave was charged with 645 g of polyethylenimine (A.1) and 32 g of water and then purged with nitrogen. Then, the autoclave was heated to 90° C. An amount of 555 g of ethylene oxide was added within 10 hours under stirring and allowed to react for additional 12 hours at 90° C. The mixture so obtained was cooled to 80° C., and the volatile ingredients were removed in vacuo. An amount of 1,245 g of a highly viscous yellow liquid was obtained.

A 2-I autoclave was charged with 330 g of the above highly viscous yellow liquid and 5.6 g of a 50% by weight aqueous KOH solution. The water was removed at 20 mbar. Then, the autoclave was purged with nitrogen and subsequently heated to 120° C. Within 12 hours, 1,000 g of ethylene oxide were added under stirring and allowed to react for additional 12 hours at 120° C. The mixture so obtained was cooled to 80° C., and the volatile ingredients were removed in vacuo. An amount of 1,331 g of a light brown solid was obtained that was inventive alkoxylated polyethylenimine (B1.1.1).

II.1.2 Synthesis of Inventive Alkoxylated Polyethylenimine (B1.1.2)

A 2-I autoclave was charged with 645 g of polyethylenimine (A.1) and 32 g of water and then purged with nitrogen. Then, the autoclave was heated to 90° C. An amount of 555 g of ethylene oxide was added within 10 hours under stirring and allowed to react for additional 12 hours at 90° C. The mixture so obtained was cooled to 80° C., and the volatile ingredients were removed in vacuo. An amount of 1,245 g of a highly viscous yellow liquid was obtained.

A 2-I autoclave was charged with 82.6 g of the above highly viscous yellow liquid and 5.5 g of a 50% by weight aqueous KOH solution. The water was removed at 20 mbar. Then, the autoclave was purged with nitrogen and subsequently heated to 120° C. Within 12 hours, 1,195 g of ethylene oxide were added under stirring and allowed to react for additional 12 hours at 120° C. The mixture so obtained was cooled to 80° C., and the volatile ingredients were removed in vacuo. An amount of 1,273 g of a light brown solid was obtained that was inventive alkoxylated polyethylenimine (B1.1.2).

II.1.3 Synthesis of Inventive Alkoxylated Polyethylenimine (B1.1.3)

A 2-1 autoclave was charged with 645 g of polyethylenimine (A.1) and 32 g of water and then purged with nitrogen. Then, the autoclave was heated to 90° C. An amount of 730 g of propylene oxide was added within 10 hours under stirring and allowed to react for additional 12 hours at 90° C. The mixture so obtained was cooled to 80° C., and the volatile ingredients were removed in vacuo. An amount of 1,356 g of a highly viscous yellow liquid was obtained.

A 2-I autoclave was charged with 155 g of the above highly viscous yellow liquid and 5.5 g of a 50% by weight aqueous KOH solution. The water was removed at 20 mbar. Then, the autoclave was purged with nitrogen and subsequently heated to 130° C. Within 12 hours, 1,126 g of propylene oxide were added under stirring and allowed to react for additional 12 hours at 130° C. The mixture so obtained was cooled to 80° C., and the volatile ingredients were removed in vacuo. An amount of 1,282 g of a light brown solid was obtained that was inventive alkoxylated polyethylenimine (B1.1.3).

II.1.4 Synthesis of Inventive Alkoxylated Polyethylenimine (B1.1.4)

A 2-I autoclave was charged with 645 g of polyethylenimine (A.1) and 32 g of water and then purged with nitrogen. Then, the autoclave was heated to 90° C. An amount of 555 g of ethylene oxide was added within 10 hours under stirring and allowed to react for additional 12 hours at 90° C. The mixture so obtained was cooled to 80° C., and the volatile ingredients were removed in vacuo. An amount of 1,245 g of a highly viscous yellow liquid was obtained.

A 2-I autoclave was charged with 124 g of the above highly viscous yellow liquid and 5.3 g of a 50% by weight aqueous KOH solution. The water was removed at 20 mbar. Then, the autoclave was purged with nitrogen and subsequently heated to 120° C. Within 12 hours, 560 g of ethylene oxide were added under stirring and allowed to react for additional 12 hours at 120° C. Then, 569 g of propylene oxide were added under stirring within 12 hours and allowed to react for additional 12 hours at 120° C. The mixture so obtained was cooled to 80° C., and the volatile ingredients were removed in vacuo. An amount of 1,295 g of a light brown solid was obtained that was inventive alkoxylated polyethylenimine (B1.1.4).

II.1.5 Synthesis of Inventive Alkoxylated Polyethylenimine (B1.1.5)

A 2-1 autoclave was charged with 645 g of polyethylenimine (A.1) and 32 g of water and then purged with nitrogen. Then, the autoclave was heated to 90° C. An amount of 555 g of ethylene oxide was added within 10 hours under stirring and allowed to react for additional 12 hours at 90° C. The mixture so obtained was cooled to 80° C., and the volatile ingredients were removed in vacuo. An amount of 1,245 g of a highly viscous yellow liquid was obtained.

A 2-I autoclave was charged with 66 g of the above highly viscous yellow liquid and 5.3 g of a 50% by weight aqueous KOH solution. The water was removed at 20 mbar. Then, the autoclave was purged with nitrogen and subsequently heated to 120° C. Within 12 hours, 759 g of ethylene oxide were added under stirring and allowed to react for additional 12 hours at 120° C. Then, 692 g of propylene oxide were added under stirring within 12 hours and allowed to react for additional 12 hours at 120° C. The mixture so obtained was cooled to 80° C., and the volatile ingredients were removed in vacuo. An amount of 1,295 g of a light brown solid was obtained that was inventive alkoxylated polyethylenimine (B1.1.5).

Further inventive alkoxylated polyethylenimines were synthesized accordingly. The properties are summarized in Table 2.

TABLE 2

Properties of inventive alkoxylated polyethylenimines (B)

| Sample | Starting material | amine value [mmol/g] | (A) $M_w/M_n$ | AO 1 | AO 2 | (B) $M_w/M_n$ | molar ratio alkylene oxide/NH |
|---|---|---|---|---|---|---|---|
| (B.1.1) | (A.1) | 19.1 | 4.1 | EO | — | 3.9 | 7 |
| (B.1.2) | (A.1) | 19.1 | 4.1 | EO | — | 3.7 | 20 |
| (B.1.3) | (A.1) | 19.1 | 4.1 | PO | — | 4.0 | 12 |
| (B.1.4) | (A.1) | 19.1 | 4.1 | EO | PO | 3.9 | 10/7 |
| (B.1.5) | (A.1) | 19.1 | 4.1 | EO | PO | 4.3 | 24/16 |
| (B.2.1) | (A.2) | 18.7 | 4.6 | EO | — | 4.5 | 7 |
| (B.2.2) | (A.2) | 18.7 | 4.6 | EO | — | 4.2 | 20 |
| (B.2.3) | (A.2) | 18.7 | 4.6 | PO | — | 4.1 | 12 |
| (B.3.1) | (A.3) | 18.5 | 5.2 | EO | — | 4.7 | 7 |
| (B.3.2) | (A.3) | 18.5 | 5.2 | EO | — | 5.0 | 20 |
| (B.3.3) | (A.3) | 18.5 | 5.2 | EO | PO | 5.0 | 10/7 |
| (B.3.4) | (A.3) | 18.5 | 5.2 | EO | PO | 5.5 | 24/16 |
| C-(B.4.1) | C-(A.4) | 20.5 | 1.4 | EO | — | 1.4 | 7 |
| C-(B.4.2) | C-(A.4) | 20.5 | 1.4 | EO | — | 1.3 | 20 |
| C-(B.4.3) | C-(A.4) | 20.5 | 1.4 | PO | — | 1.4 | 12 |
| C-(B.4.4) | C-(A.4) | 20.5 | 1.4 | EO | PO | 1.5 | 10/7 |
| C-(B.4.5) | C-(A.4) | 20.5 | 1.4 | EO | PO | 1.7 | 24/16 |
| C-(B.5.1) | C-(A.5) | 19.3 | 1.9 | EO | — | 1.9 | 7 |
| C-(B.5.2) | C-(A.5) | 19.3 | 1.9 | EO | — | 2.0 | 20 |
| C-(B.5.3) | C-(A.5) | 19.3 | 1.9 | PO | — | 2.2 | 12 |
| C-(B.6.1) | C-(A.6) | 19.0 | 2.3 | EO | — | 2.4 | 20 |
| C-(B.6.2) | C-(A.6) | 19.0 | 2.3 | EO | PO | 2.6 | 24/16 |
| (B.7.1) | (A.7) | 19.6 | 6.6 | EO | — | 5.3 | 7 |
| (B.7.2) | (A.7) | 19.6 | 6.6 | EO | — | 5.0 | 20 |
| (B.7.3) | (A.7) | 19.6 | 6.6 | EO | PO | 5.7 | 10/7 |
| (B.7.4) | (A.7) | 19.6 | 6.6 | EO | PO | 5.9 | 24/16 |
| (B.8.1) | (A.8) | 19.4 | 7.0 | EO | — | 6.0 | 20 |
| (B.8.2) | (A.8) | 19.4 | 7.0 | EO | PO | 6.4 | 10/7 |
| (B.8.3) | (A.8) | 19.4 | 7.0 | EO | PO | 6.7 | 24/16 |
| (B.8.4) | (A.8) | 19.4 | 7.0 | EO | — | 6.0 | 7 |
| (B.8.5) | (A.8) | 19.4 | 7.0 | PO | — | 6.2 | 12 |
| (B.9.1) | (A.9) | 19.5 | 4.7 | EO | — | 4.3 | 7 |
| (B.9.2) | (A.9) | 19.5 | 4.7 | EO | — | 4.2 | 20 |
| (B.9.3) | (A.9) | 19.5 | 4.7 | PO | — | 4.5 | 12 |
| C-(B.6.3) | C-(A.6) | 19.1 | 2.3 | PO | — | 2.4 | 24 |
| (B.3.5) | (A.3) | 18.5 | 5.2 | PO | — | 4.9 | 24 |

Explanations with respect to Table 2:
AO: alkylene oxide
Alkoxylated polyethylenimines C-(B.4.1), C-(B.4.2) and so forth are comparison materials. The amine value is the primary amine value und refers to the respective polyethylenimine (A).

III. Tests as Demulgators

In a 2-liter vessel, 35 ppm (mass) of inventive polyalkoxylated polyethylenimine (B) according to table 3 were dissolved in the 10-fold amount of toluene and then mixed with 1 liter of crude oil/water emulsion (oil in water) under vigorous stirring, conditions: anchor stirrer, 1200 rpm, for 5 minutes at 40° C. The crude oil/water emulsion stemmed from North Africa (samples II, III) or Western Africa (sample (I), see Table 3. Then, three 100 ml-aliquots of the respective emulsion were transferred into 3 graduated cylinders and allowed to settle. The kinetics were determined by measuring the volume of the aqueous phase after 3, 5, 8, 15 und 30 minutes. The results are summarized in Table 3. As further comparisons, the tests were repeated without the addition of any alkoxylated polyethylenimines (B).

TABLE 3 kinetics of crude oil/water emulsion (oil in water) separation

| (B) | crude oil/water emulsion | 3 min [ml] | 5 min [ml] | 8 min [ml] | 15 min [ml] | 30 min [ml] |
|---|---|---|---|---|---|---|
| — | I | — | — | 2 | 2 | 4 |
| C-(B.6.2) | I | — | 4 | 10 | 15 | 25 |
| (B.1.5) | I | 2 | 6 | 12.5 | 17 | 30 |
| (B.3.4) | I | 2 | 6 | 14 | 20 | 35 |
| (B.8.3) | I | 4 | 8 | 18 | 25 | 40 |
| C-(B.6.3) | I | 2 | 5 | 10 | 17 | 27.5 |
| (B.3.5) | I | 5 | 10 | 15 | 25 | 38 |
| — | II | — | 4 | 6 | 10 | 17 |
| C-(B.6.2) | II | 2 | 6 | 10 | 20 | 35 |
| (B.1.5) | II | 2 | 8 | 15 | 25 | 40 |
| (B.3.4) | II | 2 | 10 | 20 | 30 | 45 |
| (B.8.3) | II | 4 | 15 | 25 | 40 | 47 |
| C-(B.6.3) | II | 2 | 5 | 13 | 20 | 33 |
| (B.3.5) | II | 5 | 8 | 17.5 | 25 | 40 |
| — | III | — | — | 4 | 9 | 14 |
| C-(B.6.2) | III | 2 | 4 | 8 | 18 | 28 |
| (B.1.5) | III | 3 | 7.5 | 14 | 21 | 32 |
| (B.3.4) | III | 3 | 8 | 16 | 25 | 36 |

TABLE 3-continued kinetics of crude oil/water emulsion (oil in water) separation

| (B) | crude oil/water emulsion | 3 min [ml] | 5 min [ml] | 8 min [ml] | 15 min [ml] | 30 min [ml] |
|---|---|---|---|---|---|---|
| (B.8.3) | III | 4 | 8.5 | 21 | 30 | 44 |
| C-(B.6.3) | III | 2 | 6.5 | 13 | 21 | 27.5 |
| (B.3.5) | III | 5 | 10 | 15 | 25 | 38 |

IV. Test in Laundry Detergent Compositions

The anti-greying abilities of alkoxylated polyethylenimines (B) were tested by preparing wash solutions using water of 14° dH hardness (2.5 mmol/L; Ca:Mg:$HCO_3$ 4:1:8) containing 5 g/L of the test detergent T (see Table 5) and 1.0-2.5% of the alkoxylated polyethylenimines (B) (see Table 1)

TABLE 5

Composition of Test Detergent T

| Liquid laundry base formulation | |
|---|---|
| n-$C_{10}$-$C_{13}$-Alkylbenzene sulfonic acid | 5.7% |
| $C_{13/15}$-Oxoalkohol ethoxylated with 7 moles of ethylene | 5.4% |
| 1,2-propylenglycol | 6% |
| ethanol | 2% |
| Potassium coconut soap | 2.4% |
| KOH | 3.1% |
| Lauryl ether sulphate | 7.7% |
| Polyalkylenalkoxylate according to Table 6 | 1 or 2% |
| Water | to 100% |

As test fabrics 10 cm×10 cm squares of different cotton were selected (wfk10A as standard cotton, wfK12A as cotton terry cloth, wfk80A as cotton knit, EMPA 221 as cotton fabric, cretonne, bleached without optical brightener, T-shirt from Brantic, Kapart brand) and synthetic fabrics (wfk20A, wfk30A, EMPA406). The test was performed in a launder-O-meter (LP2 type from SDL Atlas, Inc.) with beakers of 1 L size. Soil was a mixture of two 2.5 g EMPA 101 (olive oil/carbon black on cotton, purchased at EMPA Testmaterials, St Gallen, Switzerland) and of two 2,5 g SBL 2004 fabrics (soil ballast fabric "Formula 2004" that simulates sebum grease stains, purchased from wfk Testgewebe GmbH, Brüggen, Germany). As an additional ballast soil 300 mg of a pigment-oil paste were added to the washing liquor (see below, Table 6).

The first cycle was run using the launder-O-meter beakers containing the test wash solution (0.25 L) plus test fabrics and ballast soil, at 40° C. for 20 min (fabric to liquor ratio of 1:10). After the wash, the test fabrics and ballast soil were separated. The process was repeated using the washed test fabrics and effectuating 3 cycles in total. New ballast soil was used for each cycle. After the 3 cycles, the test fabrics were rinsed in water, followed by drying at ambient room temperature overnight.

The greying of the cotton and synthetic test fabrics was measured by determining the degree of whiteness (reflectance values) after washing using a sphere reflectance spectrometer (SF 500 type from Datacolor, USA, wavelength range 360-700 nm, optical geometry d/8°) with a UV cutoff filter at 460 nm.

The anti-greying properties of the detergents tested were then quantified after addition of 1.0 to 2% of the respective alkoxylated polyethylenimines (B) (see Table 6). Reflectance values decrease with the visible greying of the fabrics, the higher the reflectance value, the better the anti-greying performance of the detergent. For simplicity, cotton delta reflectance values (ΔR) are represented in Table 3. Cotton ΔR values represent the difference between the reflectance after wash of the test detergent T containing the corresponding alkoxylated polyethylenimines (B) (R1) and the reflectance after wash of the test detergent without the alkoxylated polyethylenimines (B) for the summation of the 5 different cotton fabrics. An ΔR value>10 means a clearly visible contribution and effect of the inventive substances and a ΔR value>5 is already significant above the standard deviation. Correspondingly a broad molecular weight contribution shows improved and very stable effects in the avoidance of greying and deposition of dirt of a huge variety.

As shown in Table 3, inventive alkoxylated polyethylenimines (B) (1 to 8) have a positive effect on the secondary-washing action, preventing the re-deposition of the soil removed from the wash liquor to the fabrics.

In summary, alkoxylated polyethylenimines (B) according to the present invention outperform comparative alkoxylated polyethylenimines with a narrow molecular weight distribution. Without wishing to be bound by any bound to any theory, this can be explained with a superior dispersion profile that has to match a huge variety of dust/clay and soils that a detergent formulation has to cope with.

Selections of Clay/Soil Pigments:

For test purposes, each 23% by weight of 4 different nature-based clay samples (crude kaolin) as well as 3% bauxite from Jamaica and 3% ash from a tennis court were milled in a ball mill for a period of 30 minutes. Then, olive oil was added in a ratio of ⅓ by weight. A paste was obtained.

The clays had been selected as follows:
a) Kaolin/("Tonerde") from Germany, Kaolin Mine Hirschau-Schnaittenbach,
b) Kaolin from the USA (CE Minerals Inc, Georgia),
c) Kaolin from the USA (English Indian Clays Ltd, Kerala),
d) Kaolin from Brasil (Fa. Omnia, MIRAGLOSS 90 DRY).

Then, the test detergents according to Table 5 were tested on said soiled cottons, vide supra. The cleaning efficacy was determined photometrically by determination of the reflectance. The results are summarized in Table 6.

TABLE 6 test results on inventive laundry detergent compositions and comparative laundry detergents

| Entry | (B) (Table 2) | Cotton, Delta Reflectance (%) 1.0% by weight (B) | Cotton, Delta Reflectance (%), 2% by weight (B) |
|---|---|---|---|
| C-IV-1 | C-(B.4.2) | 8 | 13 |
| C-IV-2 | C-(B.5.1) | 10 | 13 |
| C-IV-3 | C-(B.5.2) | 7 | 12 |
| C-IV-4 | C-(B.5.3) | 5 | 9 |
| C-IV-5 | C-(B.6.1) | 9 | 12 |
| C-IV-6 | C-(B.6.2) | 12 | 16 |
| IV-7 | (B.2.1) | 14 | 19 |
| IV-8 | (B.2.2) | 17 | 23 |
| IV-9 | (B.2.3) | 13 | 17 |
| IV-10 | (B.3.1) | 17 | 22 |
| IV-11 | (B.3.2) | 17 | 25 |
| IV-12 | (B.3.3) | 19 | 27 |
| IV-13 | (B.3.4) | 19 | 29 |
| IV-14 | (B.8.1) | 22 | 31 |
| IV-15 | (B.8.2) | 25 | 30 |
| IV-16 | (B.8.3) | 24 | 31 |
| IV-17 | (B.8.4) | 22 | 29 |
| IV-18 | (B.8.5) | 18 | 25 |

The pH value of the liquid test detergents formulations was approx. 8.5.

Delta Reflectance cotton is represented as the average of a 2 times replication.

The invention claimed is:

1. An alkoxylated polyethylenimine (B) with a polydispersity $Q=M_w/M_n$ in the range from 3.5 to 10 and an average molecular weight $M_w$ in the range from 2,500 to 1,500,000 g/mol, wherein the alkoxylated polyethylenimine (B) has a polyethylenimine backbone and alkylene oxide units, wherein the polyethylenimine backbone and the alkylene oxide units are in a weight ratio in the range of from 1:2 to 1:50, wherein a molecular weight distribution of said alkoxylated polyethylenimine (B) is multimodal but not bimodal.

2. The alkoxylated polyethylenimine (B) according to claim 1 wherein said polyethylenimine backbone has a polydispersity $Q=M_w/M_n$ in the range from 3.5 to 10 and an average molecular weight $M_w$ in the range from 2,000 to 1,000,000 g/mol and the alkylene oxide units are one or more $C_2$-$C_4$-alkylene oxides.

3. The alkoxylated polyethylenimine (B) according to claim 1, wherein the alkylene oxide units are ethylene oxide and one or more $C_3$-$C_4$-alkylene oxides arranged blockwise.

4. A process for cleaning soiled metal surfaces, the process comprising: cleaning the soiled metal surfaces using a composition that comprises the alkoxylated polyethylenimine (B) of claim 1.

5. The process according to claim 4 wherein such metal surface is soiled with at least one pigment selected from the group consisting of silica, alumina, iron oxide, and soot.

6. The process according to claim 4 wherein such process is being carried out at a temperature in the range from ambient temperature up to 70° C.

7. The process according to claim 4 wherein the soil is derived from nature-based pigments.

8. A process for making the alkoxylated polyethylenimine (B) according to claim 2 comprising the steps of:
   (a) making a polyethylenimine (A) semi-discontinuously in one reactor; and
   (b) reacting the polyethylenimine (A) with at least one $C_2$-$C_4$-alkylene oxide in the presence of a base.

9. The process according to claim 8, wherein the step (a) is being performed by performing the following steps:
   (a1) charging a reactor with water, an amine or diamine, and an initiator selected from the group consisting of $CO_2$, Brönsted acids, and alkyl halides;
   (a2) adding ethylenimine and at least one substituted aziridine under polymerization conditions but without further addition of initiator, amine, and water;
   (a3) stopping the addition of the ethylenimine and the at least one substituted aziridine at a conversion of at least 99% or after 5 to 30 hours; and
   (a4) maintaining the reaction mixture at reaction conditions for at least 120 minutes.

10. The process according to claim 8, wherein the polyethylenimine (A) has a primary amine value in the range of from 10 to 500 mg KOH/g, determined according to ASTM D2074-07.

11. An aqueous composition comprising:
   (i) the alkoxylated polyethylenimine (B) according to claim 1, and at least one further ingredient selected from the group consisting of
   (ii) at least one cationic surfactant;
   (iii) at least one non-ionic surfactant selected from the group consisting of polyalkoxylated $C_1$-$C_4$-alkanols, polyalkoxylated fatty alcohols, and polyalkoxylated phenols; and
   (iv) at least one non-ionic surfactant.

* * * * *